Figure 1:
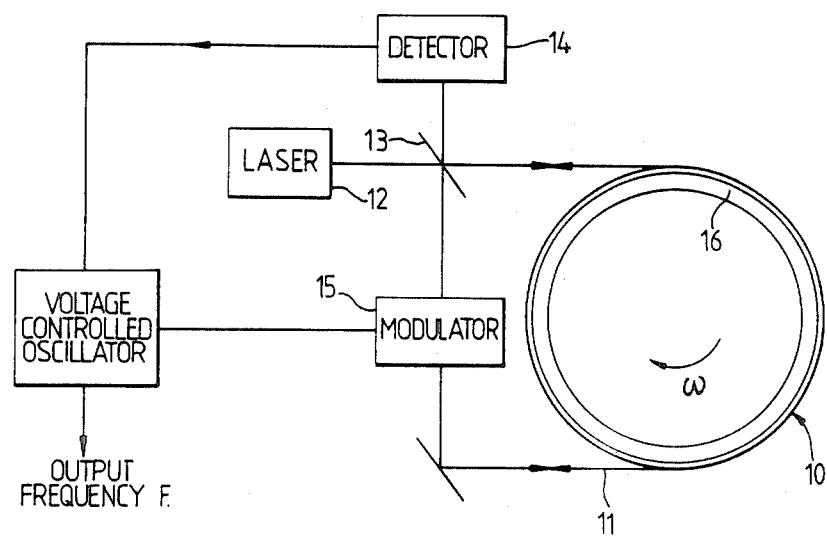

United States Patent [19]

Dye et al.

[11] Patent Number: 4,708,479
[45] Date of Patent: Nov. 24, 1987

[54] FIBRE OPTIC GYROSCOPE WITH TEMPERATURE COMPENSATION

[75] Inventors: Malcolm S. Dye, Stevenage; Arthur J. Barlow, Southampton, both of England

[73] Assignee: British Aerospace PLC, London, England

[21] Appl. No.: 639,432

[22] Filed: Aug. 10, 1984

[30] Foreign Application Priority Data

Aug. 13, 1983 [GB] United Kingdom ................. 8321870

[51] Int. Cl.$^4$ ........................ G01B 9/02; G01C 19/64
[52] U.S. Cl. .................................................. 356/350
[58] Field of Search ................................ 356/32, 350

[56] References Cited

U.S. PATENT DOCUMENTS 4,295,738 10/1981 Meltz et al. ........................... 356/32
4,299,490 11/1981 Cahill et al. ........................... 356/350

Primary Examiner—Vincent P. McGraw
Attorney, Agent, or Firm—Cushman, Darby & Cushman

[57] ABSTRACT

A fibre optic gyroscope is provided with temperature compensation means which impose on the coiled fibre a thermal coefficient of expansion which is selected to be approximately equal in value to the refractive index temperature coefficient of the fibre, thereby reducing the Scale Factor temperature coefficient. The temperature compensation means may be in the form of a former element or a coating applied to the fibre.

4 Claims, 2 Drawing Figures

U.S. Patent  Nov. 24, 1987  4,708,479

FIBRE OPTIC GYROSCOPE WITH TEMPERATURE COMPENSATION

This invention relates to fibre optic gyroscopes and in particular to temperature stabilisation of the optical scale factor of a phase-nulling fibre optic gyroscope.

The principle of the phase-nulling fibre optic gyroscope is based upon the Sagnac Interferometer in which a phase difference is caused between counter-propagating light beams by rotation. An example of such a gyroscope is described in U.S. Pat. No. 4,299,490. If interference fringes are formed between the light beams, a fringe shift occurs which is related to the rate of rotation and thus a rotation sensor may be produced by observation of the fringe shift. In the phase-nulling fibre optic gyroscope, the fringe shift or phase difference caused by an applied rate of rotation is nulled by means of a non-reciprocal frequency or phase modulator, and the extent of the frequency or phase modulation necessary to null the phase difference is a measure of the applied rotation. The factor which relates the frequency or phase modulation to the applied rate of rotation is known as the optical scale factor S of the gyroscope and it has been found that S varies with fluctuating ambient temperature, thus giving rise to errors in the determination of rotation rate. Accordingly, it is an object of this invention at least to reduce the variation of S with temperature, that is to reduce the optical scale factor temperature coefficient.

In one aspect of this invention, there is provided temperature compensation means for a fibre optic gyroscope which includes a coiled fibre through which radiation is passed in opposed directions, thereby to sense rotation of the gyro, said temperature compensation means being adapted to impose on the coiled fibre a thermal coefficient of expansion which is selected having regard to the refractive index temperature coefficient of the coiled fibre so as at least to reduce the difference therebetween.

In a phase-nulling gyro using a frequency modulation system, it can be shown that the frequency F applied to the modulator is related to the applied rate of rotation $\omega$ by the formula $F = S\omega$ where S is known as the optical scale factor. For this type of gyro, it can be shown that the optical scale factor temperature coefficient is equal to the thermal coefficient of expansion of the coil minus the refractive index temperature coefficient of the fibre. In this instance, the temperature compensation means are preferably adapted to impose on the coiled fibre a thermal coefficient of expansion which is approximately equal to the refractive index temperature coefficient of the fibre, thus substantially reducing the optical scale factor temperature coefficient.

In one arrangement, the temperature compensation means comprises a former on which the fibre is coiled, said former being made of a material having a thermal coefficient of expansion such that the former imposes on the coil a thermal coefficient of expansion which is approximately equal to the refractive index temperature coefficient of the coiled fibre.

In another arrangement, the temperature compensation means comprises a coating provided on the coiled fibre having a thermal coefficient of expansion sufficient to impose on the coiled fibre a thermal coefficient of expansion which is approximately equal to the refractive index coefficient of the coiled fibre.

In either arrangement, the temperature compensation means is preferably formed of a material which has a relatively high thermal conductivity so as to reduce thermal gradients across the coil.

Figure 2:
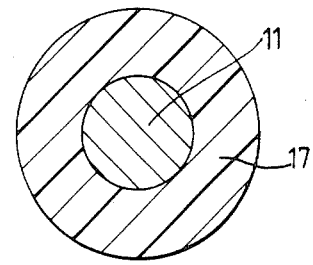

Further aspects will become apparent from the following description which is by way of example only, reference being made to the accompanying drawings, in which:

FIG. 1 is a schematic view of a first form of fibre optic gyroscope having a first form of temperature compensation means, and FIG. 2 is a sectional view through a fibre of a fibre optic gyroscope having a second form of temperature compensation means.

Referring initially to FIG. 1, there is illustrated a phase-nulling fibre optic gyroscope including a first form of temperature compensation means. The gyroscope comprises a coil 10 of single mode optical fibre 11 through which pass counter-propagating beams of light generated by laser 12 and beam splitter 13, which after having passed through the coil are recombined by beam splitter 13 onto detector 14. If a rotation $\omega$ is applied to the gyroscope, a phase difference will be introduced between the beams leaving the coil which is related to the rotation applied.

This phase difference is sensed by detector 14 and nulled by causing a compensatory phase difference by means of frequency modulator 15. One of the counter-propagating beams encounters modulator 15 before it passes through the coil 10, but the other beam passes through the coil and then through the modulator. The beams therefore both leave the coil with the same upshifted frequency but with a phase difference determined by the frequency upshift introduced by frequency modulator 15 and the length of the coil. In use, when a rotation is applied to the gyroscope, the resultant phase difference is nulled by adjustment of the frequency upshift introduced by the modulator, and it can be shown that the frequency upshift (F) required is related to the applied rate of rotation $(\omega)$ by:

$$F = \frac{2R}{\lambda n} \times \omega$$

where
R = Radius of fibre optic coil
$\lambda$ = Wavelength of light used
n = Refractive index of the fibre used.

The term $(2R/\lambda n)$ is known as the optical scale factor (S) of the gyroscope and it is wished to increase the stability of this term with temperature, and ideally to make it constant irrespective of the ambient termperature.

For a phase-nulling gyroscope employing a frequency modulator and operating at a stabilised frequency, it can be shown that the fractional change of optical scale factor due to temperature $\frac{1}{S} \cdot \frac{dS}{dT}$ (the optical scale factor temperature coefficient)

is given by $$\frac{1}{S} \cdot \frac{dS}{dT} = \frac{1}{R} - \frac{1}{n} \cdot \frac{dn}{dT} \ldots \quad (1)$$

where $$\frac{1}{R} \cdot \frac{dR}{dT}$$

is the thermal coefficient of expansion of the coil radius and $$\frac{1}{n} \cdot \frac{dn}{dT}$$

is the refractive index temperature coefficient of the fibre and it can be seen that the thermal coefficient of expansion of coil radius is equal to the thermal coefficient of expansion of the fibre, i.e.

$$\frac{1}{R} \cdot \frac{dR}{dT} = \frac{1}{L} \cdot \frac{dL}{dT}.$$

A similar analysis of scale factor S can be applied to a phase-nulling hyroscope using a phase modulator rather than a frequency modulator, and in this respect the method and apparatus described herein for temperature stabilisation of the optical scale factor can be applied to all types of nulling fibre optic gyro.

The single-mode fibres suitable for fibre gyroscopes are currently almost exclusively fabricated from highly-doped silica glass for which the refractive index temperature coefficient lies in the range of from 6 to $8 \times 10^{-6}$ degrees $C^{-1}$, dependent on $\lambda$, the operating wavelength.

Returning to FIG. 1, the coil 10 is wound on a coil former 16 which is composed of a material or materials (e.g. a concentric layer structure) such that the radial thermal expansion coefficient $$\frac{1}{R} \cdot \frac{dR}{dT}$$

of the fibre is caused to have a value approximately matching that of the refractive index temperature coefficient of the fibre. In the case of a silica-based single mode fibre, the unmodified radial thermal expansion coefficient is very low, approximately $5 \times 10^{-7}$ degrees $C^{-1}$, and consequently the coil former 16 will impart a strain on the coiled fibre, in order to impose a thermal expansion coefficient approximately equal to the refractive index temperature coefficient.

It is found that due to the photo-elastic effect the refractive index temperature coefficient of the fibre decreases—when strained by the former—by roughly 20% for a silica-based fibre and hence for the example specified, the thermal coefficient of expansion which is to be imposed on the coil should lie in the range 4.8 to $6.4 \times 10^{-6}$ degrees $C^{-1}$.

It is emphasised that it is the fibre coil which is caused to have the specified thermal expansion coefficient rather than the former. It may be found for example that due to the bundle effect of the many turns of the coil, that the thermal expansion coefficient of the former itself has to be significantly higher than that which it imparts to the coil.

The coil former 16 is also selected so as to minimise temperature gradients across the coil for these have been shown to introduce further errors, and therefore the material of which it is formed is selected to have as high a thermal conductivity as possible whilst simultaneously meeting the thermal expansion criteria given above.

The choice of coil former material is wide and suitable materials are the borosilicate glasses such as Schott glass Nos. BK 3 and BK 5 having thermal expansions of $5.3 \times 10^{-6}$ degrees $C^{-1}$ and $6.0 \times 10^{-6}$ degrees $C^{-1}$ respectively in the temperature range of $-30°$ C. and $+70°$ C. and having thermal conductivities of around 1 $Wm^{-1}K^{-1}$.

Other materials satisfying these criteria will be apparent to those skilled in the art, the selection of which will be based on cost, ease of use, availability etc.

Referring to FIG. 2, there is shown a further form of temperature compensation means; in this instance the modified thermal expansion coefficient is imposed on the fibre 11 in the coil by means of a thick outer coating 17, such as nylon, which is selected so as to provide a larger thermal expansion coefficient for the composite fibre/coating than the fibre alone and which approximates to the refractive index temperature coefficient of the fibre.

The fibre will in most cases still be wound on a coil former 10 to prevent movement of the coil, but in this instance, the coil former is made of a material which has a very small thermal expansion coefficient in order not to induce further tension and further scale factor changes.

We claim:

1. An improved form of fibre optic gyroscope of the type includng a coiled fibre through which radiation is passed in opposed directions, thereby to allow rotations of the gyroscope to be sensed, wherein the improvement comprises temperature compensation means, comprising a former element on which the fibre is coiled, adapted to impose on said coiled fibre a thermal coefficient of expansion which is selected having regard to the refractive index temperature coefficient of the coiled fibre so as to at least reduce the difference therebetween.

2. A fibre optic gyroscope as claimed in claim 1, wherein said former element is formed of a material having a relatively high thermal conductivity thereby to reduce thermal gradients across the coil.

3. A fibre optic gyroscope as claimed in claim 1, wherein said former element is formed from a borosilicate glass material.

4. An improved form of fibre optic gyroscope including:
   (a) coiled fibre means through which radiation is passed in opposite directions thereby allowing rotation of the gyroscope to be sensed;
   (b) former element means on which said fibre means is coiled and which is formed of a material having a thermal coefficient of expansion selected such that it imposes on said fibre means a net thermal coefficient of expansion which is approximately equal in value to the thermal coefficient of refractive index of the fibre means.

* * * * *